(12) United States Patent
Tabata (10) Patent No.: US 10,821,636 B2
(45) Date of Patent: Nov. 3, 2020

(54) SKIN INTEGRAL MOLDED ARTICLE AND MANUFACTURING METHOD THEREOF

(71) Applicant: TACHI-S CO., LTD., Tokyo (JP)

(72) Inventor: Tsuyoshi Tabata, Tokyo (JP)

(73) Assignee: TACHI-S CO., LTD., Tokyo (JP)

( * ) Notice: Subject to any disclaimer, the term of this patent is extended or adjusted under 35 U.S.C. 154(b) by 231 days.

(21) Appl. No.: 15/847,449

(22) Filed: Dec. 19, 2017

(65) Prior Publication Data

US 2018/0186044 A1    Jul. 5, 2018

(30) Foreign Application Priority Data

Dec. 21, 2016 (JP) .................... 2016-247483

(51) Int. Cl.
| | | |
|---|---|---|
| *B29C 44/34* | (2006.01) | |
| *B29C 44/18* | (2006.01) | |
| *B29C 44/42* | (2006.01) | |
| *B60N 2/58* | (2006.01) | |
| *B60N 2/70* | (2006.01) | |
| *B60N 2/80* | (2018.01) | |
| *B29L 31/30* | (2006.01) | |
| *B29K 105/04* | (2006.01) | |

(52) U.S. Cl.
CPC .......... *B29C 44/351* (2013.01); *B29C 44/182* (2013.01); *B29C 44/425* (2013.01); *B60N 2/5891* (2013.01); *B60N 2/7017* (2013.01); *B60N 2/80* (2018.02); *B29K 2105/04* (2013.01); *B29L 2031/3023* (2013.01)

(58) Field of Classification Search
CPC ... B29C 44/351; B29C 44/425; B29C 44/182; B29C 44/14; B29C 44/42; B29C 44/18; B29C 44/12; B60N 2/80; B60N 2/7017; B60N 2/5891; B60N 2/58; B29K 2105/04; B29L 2031/3023
See application file for complete search history.

(56) References Cited

U.S. PATENT DOCUMENTS 6,200,506 B1 * 3/2001 Takei .................... B29C 44/351
                                                    264/276

FOREIGN PATENT DOCUMENTS

| JP | 10-128769 A | 5/1998 |
|---|---|---|
| JP | 2847647 B2 | 1/1999 |
| JP | 11-314230 A | 11/1999 |
| JP | 2005-059428 A | 3/2005 |

* cited by examiner

*Primary Examiner* — James C Yager
(74) *Attorney, Agent, or Firm* — Fitch, Even, Tabin & Flannery, L.L.P.

(57) ABSTRACT

In a skin integral molded article which is formed by filling the inside of a skin which is formed into a bag shape with a foamed body and molding the foamed body integrally with the skin, an opening through which a foaming raw material is supplied into the skin is formed in the skin, in one side skin and other side skin which are formed with the opening being interposed, the one-side skin is bent into inside the opening, the other-side skin is provided with a part disposed ahead of a part which is bent into inside the opening and is formed to be pliable, and the part which is disposed ahead of the other-side skin part and is formed to be pliable is formed in contact with a leading end part of the one-side skin part which is bent into the opening.

10 Claims, 6 Drawing Sheets

SKIN INTEGRAL MOLDED ARTICLE AND MANUFACTURING METHOD THEREOF

CROSS-REFERENCE TO RELATED APPLICATIONS

This application claims the benefit of Japanese Patent Application No. 2016-247483 filed Dec. 21, 2016, the contents of which is incorporated herein by reference as if fully rewritten herein.

BACKGROUND

The present invention relates to a skin integral molded article and a manufacturing method thereof and, in particular, relates to the skin integral molded article and the manufacturing method thereof configured in such a manner that a foaming raw material is injected into a skin which is formed into a bag shape and is foamed into the form of a foamed body in the skin, the inside of the skin is filled with the foamed body and thereby the skin and the foamed body contained in the skin are integrally molded.

As the skin integral molded article, in regard to, for example, molding of a headrest of a vehicle seat, there is a description that in the headrest configured by foaming a pad integrally with a skin which is sewed into a bag shape, a cover piece (1) equipped with an injection port (10A) which extends inward is provided on an end edge of an opening (A) in a skin (C) which is sewed into the bag shape for prevention of leakage of a foaming raw material for pad molding to the outside and the foaming raw material for pad molding is injected by inserting an injection nozzle (30) in Abstract of, for example, Japanese Unexamined Patent Application Publication No. Hei10-128769 (Patent Literature 1).

In addition, there is a description that in a headrest configured by foaming a pad integrally with a skin which is sewed into a bag shape, a hook projection (2) is provided on an injection nozzle (1) to be inserted into the skin through an opening (A) formed in a skin (C) which is sewed into the bag shape for prevention of leakage of a foaming raw material for pad molding to the outside with no provision of a closing member on the opening, and the injection nozzle (1) which is inserted into the skin (C) is pulled in a direction opposite to an insertion direction, and thereby the opening (A) is closed with a tongue piece (40) which is disposed to extend inward from the opening (A) in the skin (C) and thereafter the foaming raw material is injected into the skin (C) through the injection nozzle (1) in Abstract of Japanese Unexamined Patent Application Publication No. Hei11-314230 (Patent Literature 2).

In addition, there is described a manufacturing method for headrest that in a headrest which is manufactured by forming a skin member H by sewing together a plurality of skin configuring members, forming a foaming raw material injection port 15 in a predetermined position of a slit 14 between a lower front side skin member 6 and a lower rear side skin member 7 of a lower-side skin member 5 of the skin member H and injecting the foaming raw material for a cushion material 2 by inserting an injection nozzle 20 into the injection port 15, exposed parts 10, 11 which are exposed to the front surface side of a headrest body 1 and embedded parts 12. 13 which are embedded in the foamed cushion material 2 in a state of being in close contact with each other are formed respectively on and in the lower front side skin member 6 and the lower rear side skin member 7, a one-side end edge 18 of embedded cloth for injection port formation 17 in which an injection port 15 is formed by a notched part 16 which is almost the same size as an injection nozzle 20 is sewed 19 on an end edge which faces a slit 14 in one of the front-side embedded part 12 of the lower front side skin member 6 and the rear-side embedded part 13 of the lower rear side skin member 7, and the injection nozzle 20 which is inserted through the slit 14 is put into the skin member H through the injection port 15, and the foaming raw material is foamed, for prevention of leakage of the foaming raw material, facilitation of sewing-on work, facilitation of foaming work and improvement of design freedom, in Abstract of Japanese Unexamined Patent Application Publication No. 2005-59428 (Patent Literature 3).

Further, there is described a manufacturing method for insert built-in skin integral foamed article characterized in that in the insert built-in skin integral foamed article manufacturing method of disposing an insert in a bag-shaped skin which forms a slit-shaped opening, setting the insert and the skin in a foaming mold, thereafter injecting a foaming raw material into the skin through the above-described opening and integrally foaming and molding the skin and the insert, one pair of tongue pieces are provided by extending skin end edges from the opining into the skin, a tube-shaped film is sandwiched between the tongue pieces and a plate-shaped jig of a length which is almost equal to a length of the opening is inserted into between the tongue pieces and is set with a lower end of the plate-shaped jig being held in the tongue pieces and thereby the opening is linearly stretched by the plate-shaped jig, thereafter, a funnel is inserted into the above-described tube-shaped film and the foaming raw material is injected into the skin via the funnel or an injection nozzle for the foaming raw material is inserted into the above-described tube-shaped film and the foaming raw material is injected into the skin, foam molding is performed and thereafter the above-described plate-shaped jig is pulled out from between the tongue pieces in claim 1 of Japanese Patent No. 2847647 (Patent Literature 4).

If the headrest of the vehicle seat is formed by skin integral molding by foaming the foaming raw material and molding the pad in the skin which is sewed into the bag shape, as a method of preventing leakage of the foamed body to the outside in pad molding, there is the description that the cover piece (1) equipped with the injection port (10A) which extends inward is provided on the end edge of the opening (A) in the skin (C) which is sewed into the bag shape and the foaming raw material for pad molding is injected by inserting the injection nozzle (30) in Patent Literature 1. However, nothing is described about sure prevention of leakage of the foamed body for pad molding to the outside by surely bringing the cover piece in which the injection port is formed into contact with the other cover piece when injecting the foaming raw material.

In addition, in Patent Literature 2, the method of injecting the foaming raw material into the skin through the injection nozzle after closing the opening with the tongue piece which extends inward from the opening of the skin by pulling the injection nozzle which is inserted into the skin in the direction opposite to the insertion direction is indicated. However, even when the injection nozzle is pulled in the direction opposite to the insertion direction, it is not necessarily possible to surely bring the cover piece on the side that the injection nozzle is inserted into contact with the other cover piece over the entire width-wise region of this cover piece and there is a possibility that a case where it is not possible to surely prevent leakage of the foamed body for pad molding to the outside may occur.

Further, in Patent Literature 3, although the injection port is formed in the embedded cloth for formation of the injection port by the notched part of the size which is almost the same as that of the injection nozzle, a gap is generated between the injection nozzle and the embedded cloth for formation of the injection port as illustrated in FIG. 9 of Patent Literature 3. Thus, there is a possibility that the foamed body may leak out to the outside through this gap and there is a possibility that a case where it is not possible to surely prevent leakage of the foamed body for pad molding to the outside may occur.

Still further, in Patent Literature 4, the configuration that the tube-shaped film is sandwiched between one pair of the tongue pieces which are provided by extending the skin end edges from the opening into the skin and the foamed body is supplied into the skin through this tube is indicated. However, there is a possibility that a case where the gap is formed between each of one pair of the tongue pieces formed by extending the facing end edges of the skin and bending them into the skin and the tube and it is not possible to surely prevent leakage of the foamed body for pad molding to the outside through this gap may occur.

SUMMARY

The present invention has been made to address the above-described issues of existing techniques and provides a skin integral molded article and a manufacturing method thereof making it possible to surely prevent leakage of a foamed body for pad molding to the outside in a case where skin integral molding is performed by supplying a foaming raw material into a skin which is sewed into a bag shape and foaming the foaming raw material into the form of a foamed body and then molding the foamed body into the form of a pad.

In order to address the above-described issues, according to one embodiment of the present invention, there is provided a skin integral molded article comprising a skin which is formed into a bag shape and a foamed body which is molded integrally with the skin by foaming a foaming raw material inside the skin formed into the bag shape, wherein the skin formed into the bag shape has an opening through which a foaming raw material is to be supplied inside the skin formed into the bag shape for molding the foamed body inside the skin formed into the bag shape, one side of the opening of the skin formed into the bag shape having a bent part which is bent into inside the opening, the other side of the opening of the skin formed into the bag shape having another bent part which is bent into inside the opening and a pliable part is formed at near an ahead of the another bent part, the bent part which is bent into inside the opening and the another bent part which is bent into inside the opening are facing each other with a certain gap near a center of the opening and tightly contacting with each other at both sides apart from the center of the opening, and a part which is ahead of the pliable part formed at near the ahead of the another bent part bent into inside the opening is closely contact with the bent part which is formed at the one side of the opening and bent into inside the opening.

In order to address the above-described issues, according to another embodiment of the present invention, there is provided a method of manufacturing a skin integral molded article, comprising the steps of: inserting a nozzle into an opening formed by a skin which is formed into a bag shape, one side of the opening of the skin formed into the bag shape having a bent part which is bent into inside the opening and the other side of the opening of the skin having another bent part which is bent into inside the opening and is formed a pliable part at near an ahead of the another bent part; pushing the nozzle to pass through a hole formed at the another bent part or at a part which is ahead of the pliable part; pulling the skin in a longitudinal direction of the opening to bring the bent part of the one side of the opening formed by the skin into tight contact with the another bent part of the other side of the opening formed by the skin at parts which are apart from the nozzle the chip of which is pass through the hole; pulling back the nozzle to tightly contact the part which is ahead of the pliable part formed at near the ahead of the another bent part with the bent part formed at the one side of the opening of the skin; supplying a foaming raw material inside the skin which is formed into the bag shape through the nozzle; forming a bag shape by filling the inside of the skin formed into the bag shape with a foamed body formed by the supplied foaming raw material and molding the foamed body integrally with the skin formed into the bag shape, and pulling back the nozzle from inside the opening.

According to the embodiments of the present invention, it is possible to form the skin integral molded article is possible by molding by surely filling the inside of the bag-shaped skin with the foamed body with no leakage of the foamed body to the outside.

DESCRIPTION OF THE PREFERRED EMBODIMENTS

The present invention relates to a skin integral molded article and a manufacturing method thereof making it possible to surely prevent leakage of a foamed body to the outside.

In a case that the skin integral molded article according to one embodiment of the present invention is applied to a headrest of a vehicle seat, in a configuration that a foaming raw material is injected into a bag formed by a skin (a bag-shaped skin) through a nozzle or a tube to foam the foaming raw material inside the bag-shaped skin to fill inside the bag-shaped skin with the foamed body, in which the headrest is configured to be able to surely prevent from leaking a foamed material (the foamed body) to the outside through between the nozzle or the tube and the bag-shaped skin.

In the following, embodiments that the skin integral molded article according to the present invention is applied to a headrest of a vehicle seat will be described by using the drawings.

In all the drawings illustrated for description of the embodiments of the present invention, the same numerals are assigned to elements having the same functions and repetitive description thereof is omitted in principle. In the following, the embodiments of the present invention will be described in detail by using the drawings.

However, the present invention shall not be construed as an invention limited to the contents described in the embodiments which will be described in the following. A person skilled in the art would readily understand that a specific configuration thereof may be modified within a range not deviating from the idea or the gist of the present invention.

First Embodiment

Figure 1:
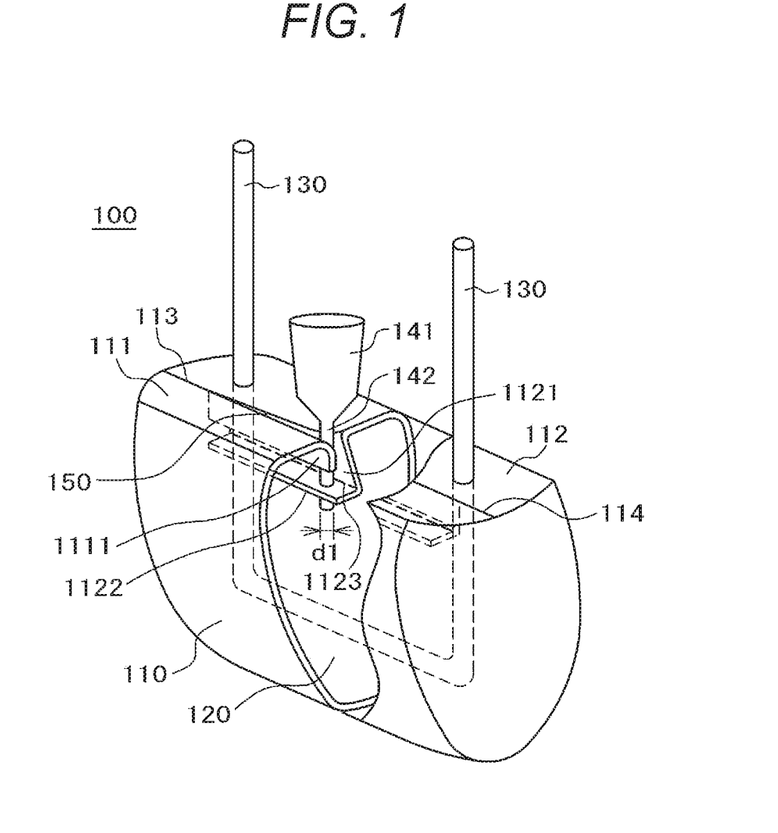
FIG. 1 is a partially sectional perspective view illustrating one example of a headrest according to a first embodiment of the present invention.
Figure 2:
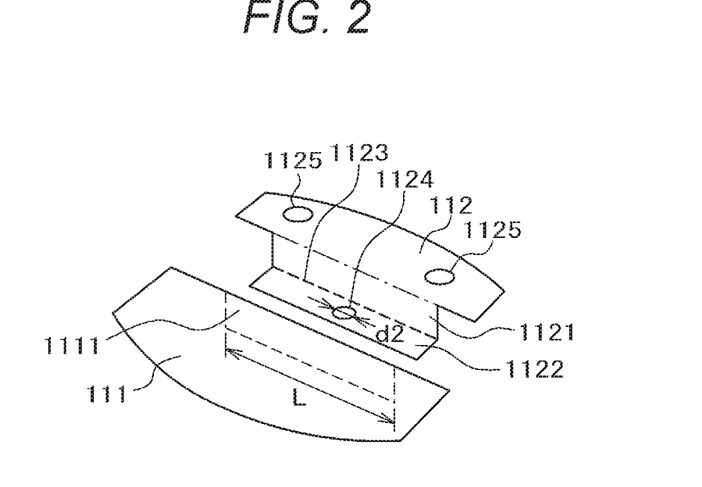
FIG. 2 is a perspective view illustrating one example of a front-side skin and a rear-side skin of the headrest according to the first embodiment of the present invention.

FIG. 1 is a perspective view illustrating one example of a headrest 100 in a state of injecting a foaming raw material into the headrest 100 according to a first embodiment. FIG. 2 is a perspective view illustrating one example of a front-side skin 111 and a read-side skin 112 which form an opening 150 of the headrest 100.

The headrest 100 according to the first embodiment includes a skin 110 which is formed into a bag shape and covers the surface of the headrest 100, a foamed body 120 which is formed by injecting the foaming raw material into the bag-shaped skin formed by the skin 100 and foaming the foaming raw material to fill inside the bag-shaped skin so as to be molded integrally with the bag-shaped skin 110, and a stay 130, part of which is embedded in the foamed body 120 and the both ends of which project outward from the skin 110.

The headrest 100 is mounted to a seatback by facing parts (the both ends) of the stay 130 which project outward from the skin 110 downward and inserting the parts into receiving holes formed in an upper part of the seatback of the vehicle seat which is not illustrated in the drawing.

In a state of facing the ends of the stay 130 upward in such a manner as illustrated in FIG. 1, an upper-side face of the skin 110 (the face which faces the upper part of the seatback when the ends of the stay 130 which project outward from the skin 110 are inserted into the receiving holes formed in a headrest stay guide which is disposed on the upper part of the seatback of the vehicle seat which is not illustrated in the drawing) is formed by the front-side skin 111 and the rear-side skin 112.

The front-side skin 111 and the rear-side skin 112 are sewed together along sewed parts 113 and 114 and are mutually coupled. A part which is not sewed, that is, the opening 150 is formed between the sewed parts 113 and 114. FIG. 1 illustrates one example of a state where a nozzle 142 which is a leading end part of a funnel 141 is inserted into the inner part which is covered with the bag-shaped skin 110 through the opening 150 which is facing upward.

As illustrated in FIG. 2, in the front-side skin 111, a leading end part 1111 of a width which is the same as a width of the opening 150 is bent downward. Margins to sew up along which the front-side skin 111 is sewed together with the rear-side skin 112 are formed on the both sides of the leading end part 1111. However, illustration of the margins to sew up is omitted for simplification of illustration in FIG. 2.

In contrast, as illustrated in FIG. 2, in the rear-side skin 112, a leading end part 1121 of a width which is the same as the width of the opening 150 is bent downward and an end part 1122 which is disposed ahead of the leading end part 1121 is further bent. A seam is formed on a boundary part 1123 between the leading end part 1121 and the end part 1122 by a sewing machine and thereby the boundary part 1123 is formed thinner than the leading end part 1121 and the end part 1122. Margins to sew up along which the rear-side skin 112 is sewed together with the front-side skin 111 are formed on the both sides of the leading end part 1121. However, illustration of the margins to sew up is omitted for simplification of illustration in FIG. 2. Incidentally, 1125 denotes holes which are formed to pass the both ends of the stay 130.

Figure 3:
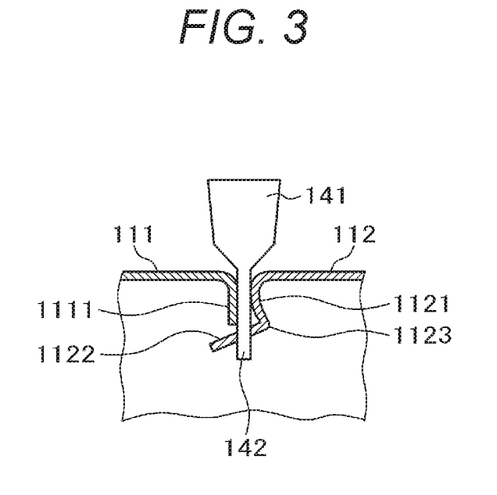
FIG. 3 is a sectional diagram illustrating one example of a state of deeply inserting a nozzle of a funnel into the headrest according to the first embodiment of the present invention.

1124 denotes a hole formed in the end part 1122 and the nozzle 142 which is the leading end part of the funnel 141 is passed through the hole 1124. A diameter d2 of the hole 1124 is formed slightly smaller than a diameter (an outer diameter) d1 of the nozzle 142 which is the leading end part of the funnel 1141. Owing to such a dimensional relation between the hole 1124 and the nozzle 142, when the nozzle 142 which is the leading end part of the funnel 141 is passed through the hole 1124 formed in the end part 1122, the hole 1124 is expanded by the nozzle 142 and is brought into tight contact with the nozzle 142 and thereby a state where a gap is not formed between the end part 1122 and the nozzle 142 is obtained as illustrated in FIG. 3.

Figure 4:
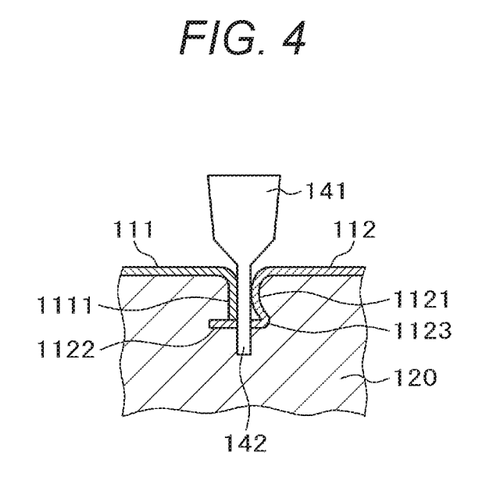
FIG. 4 is a sectional diagram illustrating one example of a state where the nozzle of the funnel which is deeply inserted into the headrest according to the first embodiment of the present invention is slightly pulled up.

The boundary part 1123 is made thinner than the leading end part 1121 and the end part 1122 by forming the seam on the boundary part 1123 between the leading end part 1121 and the end part 1122 on the side of the rear-side skin 112 (hereinafter, referred to as the rear-side skin 112 side) by the sewing machine. In this state, the nozzle 142 is temporarily passed through the hole 1124 formed in the end part 1122 and then is pulled up as illustrated in FIG. 4. Thereby, bending stresses which occur at the leading end part 1121 and the end part 1122 are concentrated on the seamed boundary part 1123. Consequently, the end part 1122 becomes pliable relative to the leading end part 1121 in comparison with a case where the boundary part 1123 is not seamed as in the cases described in Patent Literature 1 and 2.

In case of foaming raw material is supplied into the bag-shaped skin 110 through the nozzle 142, first, the nozzle 142 is inserted into the bag-shaped skin 110 through the opening 150 and a leading end part of the nozzle 142 is passed through the hole 1124 formed in the end part 1122.

In this situation, a state where no gap is formed between the hole 124 formed in the end part 1122 and the nozzle 142 is brought.

Then, tensile force is exerted on the opening 150 in a longitudinal direction of the opening (in the following, referred to as the longitudinal direction of the opening 150) by a means which is not illustrated in the drawing. In this tensile force exerted state, the leading end part 1111 on the front-side skin 111 side which is situated in the opening 150 and the leading end part 1121 on the rear-side skin 112 side which is situated in the opening 150 come into tight contact with each other at a part which is separated from the nozzle 142. In contrast, in the vicinity of the nozzle 142, the gap is formed between the leading end part 1111 on the front-side skin 111 side and the leading end part 1121 on the rear-side skin 112 side with the nozzle 142 being interposed therebetween and a state where the inside of the bag-shaped skin 110 is not sealed against the outside of the skin 110 is brought.

Here, owing to a structure that the end part 1122 is made pliable relative to the leading end part 1121, the end part 1122 in which the hole 1124 is formed is pulled up by the nozzle 142 by pulling up (pulling back) the nozzle 142 which is temporarily passed through the hole 1124 to such an extent that the nozzle 142 does not get out of the hole 1124 in a state of exerting the tensile force on the opening 150 in the longitudinal direction of the opening 150. Thereby, it becomes possible to surely press the end part 1122 against the leading end part 1111 on the front-side skin 111 side with no gap in tight contact with the leading end part 1111 on the front-side skin 111 side.

Consequently, a bottom (a boundary between the gap and the space in the bag-shaped skin 110) of the gap which is formed between the leading end part 1111 on the front-side skin 111 side and the leading end part 1121 on the rear-side skin 112 side in the vicinity of the nozzle 142 is closed. Thereby, it is possible to bring the inside of the bag-shaped skin 110 into a state of being sealed against the outside of the skin 110 at parts other than the nozzle 142.

The foaming raw material is supplied into the bag-shaped skin 110 through the nozzle 142 by a supplying means which is not illustrated in the drawing in such a state. The foaming raw material supplied into the bag-shaped skin 110 foams into the form of the foamed body 120 and the foamed body 120 is filled inside the bag-shaped skin 110. In this case, as illustrated in FIG. 4, the bottom of the gap which is formed between the leading end part 1111 on the front-side skin 111 side and the leading end part 1121 on the rear-side skin 112 side in the vicinity of the nozzle 142 is sealed with the end part 1122 on the rear-side skin 112 side.

As a result, it is possible to surely fill the inside of the bag-shaped skin 110 with the foamed body 120 which is generated in the bag-shaped skin 110 with no leakage to the outside through the opening 150.

According to the first embodiment, it is possible to seal the bottom (the part which communicates with the inside of the bag-shaped skin 110) of the gap which is formed between the front-side skin 111 (the leading end part 1111 thereof) and the rear-side skin 112 (the leading end part 1121 thereof) in the vicinity of the nozzle 142 in a state of pulling the opening 150 formed between the front-side skin 111 and the rear-side skin 112 in the longitudinal direction of the opening 150. Thereby, it is possible to surely fill the inside of the bag-shaped skin 110 with the foamed body 120 with no leakage of the foamed body 120 to the outside through the opening 150 and thereby it is possible to form the headrest 100 by molding without spoiling appearance quality.

In addition, since it is possible to surely fill the inside of the bag-shaped skin 110 with the foamed body 120 with no leakage of the foamed body 120 to the outside through the opening 150, it is possible to suppress generation of defective products and thereby it is possible to increase the yield of products.

First Modification of First Embodiment

In the first embodiment, an example that a width of the end part 1122 on the rear-side skin 112 side is made the same as a width L of the leading end part 1111 on the front-side skin 111 side is described. However, it is enough for the end part 1122 to cover the bottom of the gap which is formed between the front-side skin 111 (the leading end part 1111 thereof) and the rear-side skin 112 (the leading end part 1121 thereof) in the vicinity of the nozzle 142 in the state of pulling the opening 150 in the longitudinal direction of the opening 150. Accordingly, it is not typically necessary to make the width of the end part 1122 the same as the width L of the leading end part 1111 on the front-side skin 111 side.

Figure 6:
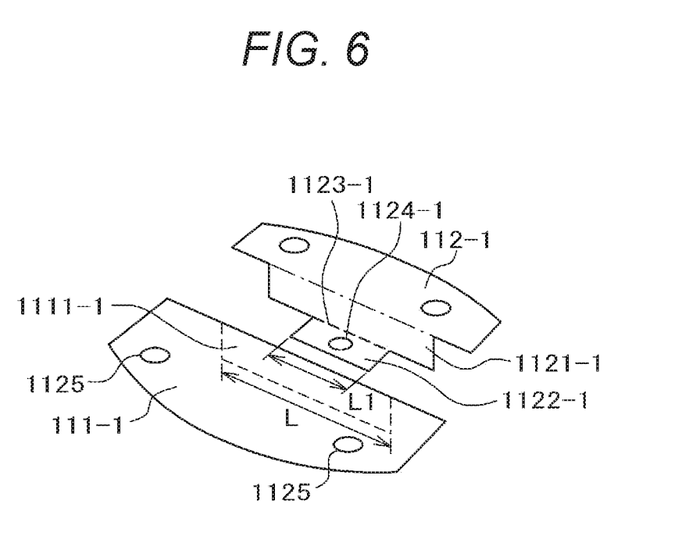
FIG. 6 is a perspective view illustrating one example of a front-side skin and a rear-side skin of the headrest according to the first modification of the first embodiment of the present invention.

In the first modification, as illustrated in FIG. 6, a width L1 of an end part 1122-1 on the rear-side skin 112-1 side is formed smaller than the width L of a leading end part 1111-1 on the front-side skin 111-1 side.

Figure 5:
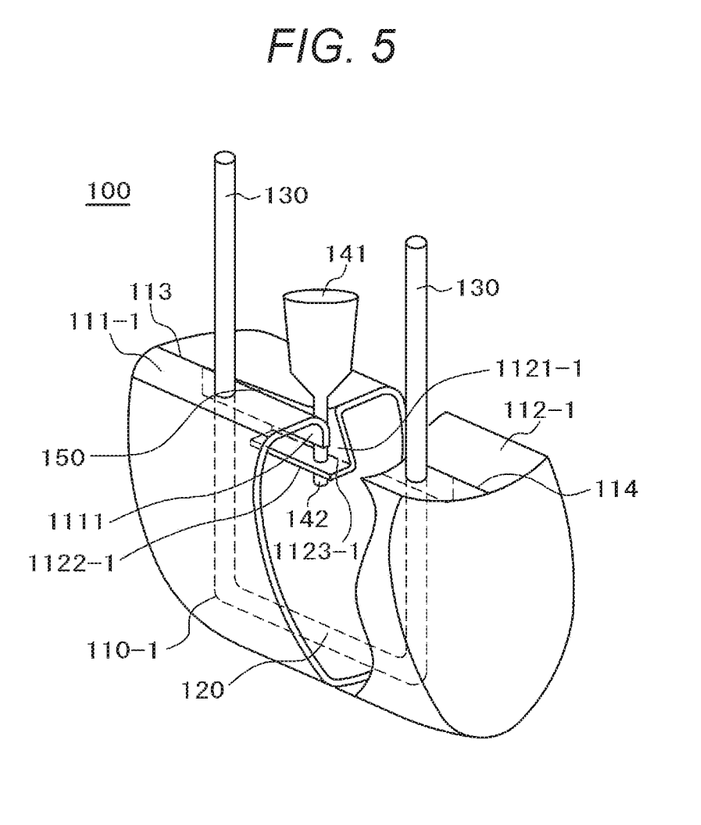
FIG. 5 is a partially sectional perspective view illustrating one example of a headrest according to a first modification of the first embodiment of the present invention.

In a case of the stay 130 is attached to the front-side skin 111-1 side as illustrated in FIG. 5, when the width L1 of the end part 1122-1 on the rear-side skin 112-1 side is formed the same as the width L of the leading end part 1111-1 on the front-side skin 111-1 side, such a situation occurs that the end part 1122-1 on the rear-side skin 112-1 side interferes with the stay 130. However, by forming the width L1 of the end part 1122-1 on the rear-side skin 112-1 side smaller than the width L of the leading end part 1111-1 on the front side skin 111-1 side as in the case of the first modification illustrated in FIG. 6, it is possible to surely cover the bottom of the gap which is formed between the front-side skin 111-1 (the leading end part 1111-1 thereof) and the rear-side skin 112-1 (a leading end part 1121-1 thereof) in the vicinity of the nozzle 142 with the end part 1122-1 on the rear-side skin 112-1 side in the state of pulling the opening 150 in the longitudinal direction of the opening 150 with no interference with the stay 130.

Second Modification of First Embodiment

The first embodiment is configured in such a manner that the boundary part 1123 is made partially thin by forming the seam on the boundary part 1123 between the leading end part 1121 and the end part 1122 on the rear-side skin 112 side by the sewing machine thereby to allow sure bending of the rear-side skin 112 (the end part 1122 thereof) along the boundary part 1123 by concentrating the stress on the boundary part 1123 which is formed partially thin when pulling up the nozzle 142 which is temporarily passed through the hole 1124 formed in the end part 1122.

In contrast, in a second modification, the boundary part 1123 between the leading end part 1121 and the end part 1122 on the rear-side skin 112 side is formed to be partially thinned by heating and pressing the boundary part 1123 by using a heater, in place of making the boundary part 1123 partially thin by forming the seam on the boundary part 1123 using the sewing machine. Thereby, when pulling up the nozzle 142 which is temporarily passed through the hole 1124 formed in the end part 1122, the stress is concentrated on the boundary part 1123 which is formed to be partially thinned to allow sure bending of the rear-side skin 112 (the end part 1122 thereof) along the boundary part 1123 similarly to the case of the first embodiment.

Thereby, it is possible to seal the bottom of the gap which is formed between the front-side skin 111 (the leading end part 1111 thereof) and the rear-side skin 112 (the leading end part 1121 thereof) in the vicinity of the nozzle 142 with the end part 1122 on the rear-side skin 112 side in the state of pulling the opening 150 formed between the front-side skin 111 and the rear-side skin 112 in the longitudinal direction of the opening 150 and thereby it is possible to surely fill the inside of the bag-shaped skin 110 with the foamed body 120 with no leakage of the foamed body 120 to the outside through the opening 150 similarly to the case of the first embodiment.

Second Embodiment

In the first embodiment, as a configuration adapted to surely pull up the end part 1122 by pulling upward the nozzle 142 after inserting the nozzle 142 into the hole 1124 formed in the end part 1122 on the rear-side skin 112 side and thereby to cover the bottom of the gap which is formed between the front-side skin 111 (the leading end part 1111 thereof) and the rear-side skin 112 (the leading end part 1121 thereof) in the vicinity of the nozzle 142 with the end part 1122, the configuration that the seam is formed on the boundary part 1123 between the leading end part 1121 and the end part 1122 on the rear-side skin 112 side by the sewing machine is described.

In contrast, a second embodiment is configured in such a manner that a leading end part 1121-2 and an end part 1122-2 on the rear-side skin 112-2 side are separately formed and a junction 1123-2 between the leading end part 1121-2 and the end part 1122-2 is sewed by the sewing machine. Configurations of parts other than the above are the same as those in the first embodiment and therefore description thereof is omitted.

Figure 7:
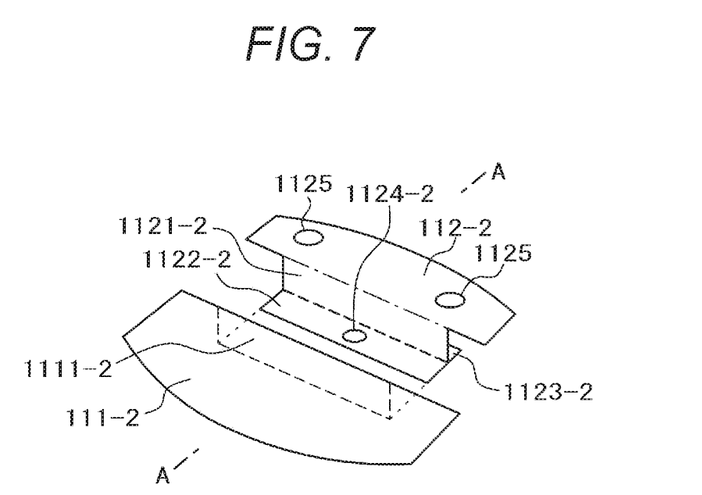
FIG. 7 is a perspective view illustrating one example of a front-side skin and a rear-side skin of a headrest according to a second embodiment of the present invention.

One example of configurations of a front-side skin 111-2 and the rear-side skin 112-2 according to the second embodiment is illustrated in FIG. 7. By configuring the front-side skin 111-2 and the rear-side skin 112-2 in this way, the nozzle 142 is temporarily passed through a hole 1124-2 and then is pulled up in a state of exerting the tensile force on the opening 150 in the longitudinal direction of the opening 150 and thereby holding a leading end part 1111-2 on the front-side skin 111-2 side in tight contact with a leading end part 1121-2 on the rear-side skin 112-2 side at a part separated from the nozzle 142 similarly to the case described in the first embodiment. Thereby, the end part 1122-2 is bent upward from the sewed junction 1123-2 and the vicinity of a leading end part of the end part 1122-2 in which the hole 1124-2 is formed is surely pressed against the leading end part 1111-2 on the front-side skin 111-2 side.

Figure 8:
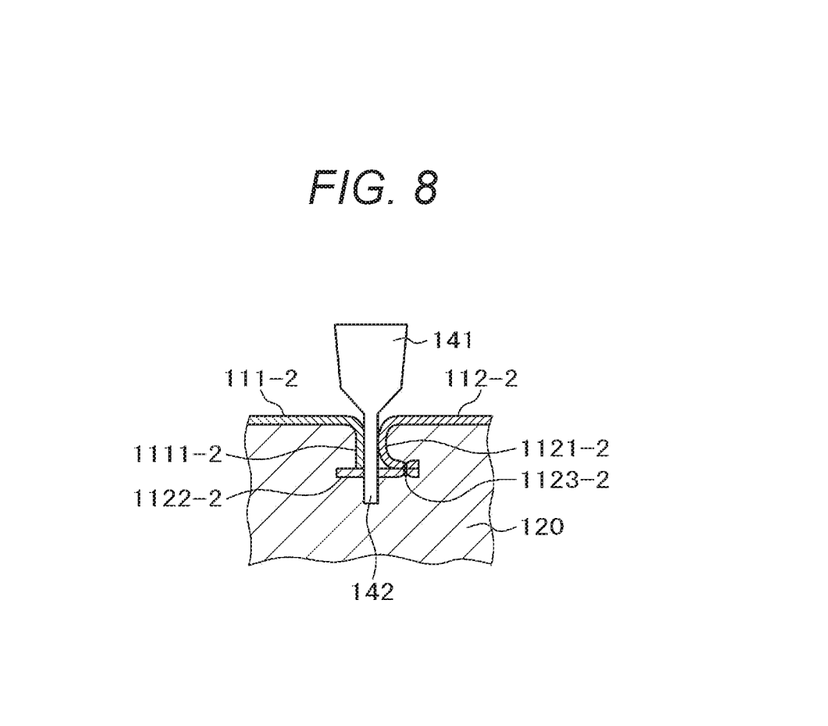
FIG. 8 is a sectional diagram illustrating one example of a state where a nozzle of a funnel which is deeply inserted into the headrest according to the second embodiment of the present invention is slightly pulled up.

FIG. 8 illustrates one example of a state where the nozzle 142 is temporarily inserted into the hole 1124-2 formed in the end part 1122-2 and thereafter is pulled upward and the end part 1122-2 is pressed against the leading end part 1111-2 on the front-side skin 111-2 side in the A-A section in FIG. 7.

Thereby, the bottom of the gap which is formed between the leading end part 1111-2 on the front-side skin 111-2 side and the leading end part 1121-2 on the rear-side skin 112-2 side in the vicinity of the nozzle 142 is closed in a state of exerting the tensile force on the opening 150 in the longitudinal direction of the opening 150 and thereby it is possible to bring the inside of the bag-shaped skin 110 into a state of being sealed against the outside of the skin 110.

The foaming raw material is supplied into the bag-shaped skin 111 through the nozzle 142 by a supply means which is not illustrated in the drawing and is foamed into the form of the foamed body 120 in the bag-shaped skin 110 in this state. Thereby, since the gap which is formed between the leading end part 1111-2 on the front-side skin 111-2 side and the leading end part 1121-2 on the rear-side skin 112-2 side in the vicinity of the nozzle 142 is sealed with the end part 1122-2 on the rear-side skin 112-2 side, it is possible to surely fill the inside of the bag-shaped skin 110 with the foamed body 120 with no leakage of the foamed body 120 to the outside through the opening 150.

Incidentally, as described in the modifications of the first embodiment, a width of the end part 1122-2 on the rear-side skin 112-2 side may be formed smaller than the width L of the leading end part 1111-2 on the front-side skin 111-2 side.

According to the second embodiment, it is possible to seal the gap which is formed between the front-side skin 111-2 (the leading end part 1111-2 thereof) and the rear-side skin 112-2 (the leading end part 1121-2 thereof) in the vicinity of the nozzle 142 with the end part 1122-2 on the rear-side skin 112-2 side in the state of pulling the opening 150 which is formed between the front-side skin 111-2 and the rear-side skin 112-2 in the longitudinal direction of the opening 150. Thereby, it is possible to surely fill the inside of the bag-shaped skin 110 with the foamed body 120 with no leakage of the foamed body 120 to the outside through the opening 150 and therefore it is possible to form a headrest according to the second embodiment by molding without spoiling the appearance quality.

In addition, it is possible to surely fill the inside of the bag-shaped skin 110 with the foamed body 120 with no leakage of the foamed body 120 to the outside through the opening 150. Therefore, it is possible to suppress the generation of the defective products and therefore it is possible to increase the yield of the products.

Modification of Second Embodiment

Figure 9:
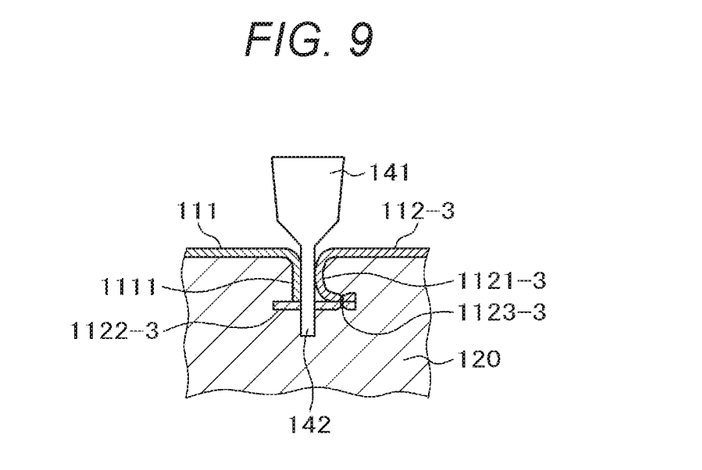
FIG. 9 is a sectional diagram illustrating one example of a state where a nozzle of a funnel which is deeply inserted into a headrest according to a first modification of the second embodiment of the present invention is slightly pulled up.

The second embodiment is configured in such a manner that the leading end part 1121-2 and the end part 1122-2 on the rear-side skin 112-2 side are separately formed and the junction 1123-2 between the leading end part 1121-2 and the end part 1122-2 is sewed by the sewing machine as illustrated in FIG. 7 and FIG. 8. In contrast, the present modification is configured in such a manner that a leading end part 1121-3 and an end part 1122-3 on the rear-side skin 112-3 side are joined together along a junction 1123-3 by thermal compression bonding and sewing as illustrated in FIG. 9.

It is possible to obtain the effects similar to those described in the second embodiment also by joining together the leading end part 1121-3 and the end part 1122-3 on the rear-side skin 112-3 side in such a configuration as described above.

Third Embodiment

In the first embodiment, the hole 1124 through which the nozzle 142 is passed is formed in the part which is closer to the leading end of the end part 1122 than to the seamed boundary part 1123. In contrast, a third embodiment is configured in such a manner that a seamed boundary part 1123-4 on the rear-side skin 112-4 side is formed at a part which is closer to a leading end of an end part 1122-4 than to a hole 1124-4 through which the nozzle 142 is to be passed. Configurations of other parts are the same as those in the case of the first embodiment and therefore description thereof is omitted.

Figure 10:
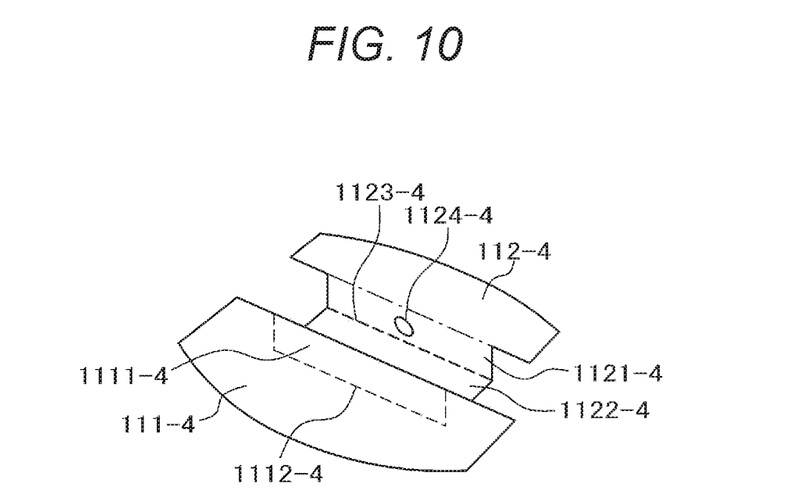
FIG. 10 is a perspective view illustrating one example of a front-side skin and a rear-side skin of a headrest according to a third embodiment of the present invention.

As illustrated in FIG. 10, in the rear-side skin 112-4, a leading end part 1121-4 of a width which is the same as the width of the opening 150 is bent downward and the hole 1124-4 through which the nozzle 142 is to be passed is formed in the leading end part 1121-4. The seam is formed on the boundary part 1123-4 between the leading end part 1121-4 and the end part 1122-4 which is disposed ahead of the leading end part 1121-4 by the sewing machine and the seamed boundary part 1123-4 is formed thinner than the leading end part 1121-4 and the end part 1122-4.

Owing to formation of the seam on the boundary part 1123-4 between the leading end part 1121-4 and the end 1122-4 on the rear-side skin 112-4 side by the sewing machine, the boundary part 1123-4 is made thinner than the leading end part 1121-4 and the end part 1122-4. The nozzle 142 is temporarily passed through the hole 1124-4 formed in the leading end part 1121-4 and thereafter is pulled up in this state. Thereby the leading end part 1121-4 is lifted and the end part 1122-4 is pressed against a leading end part 1111-4 on the front-side skin 111-4 side.

Here, the boundary part 1123-4 on which the seam is formed by the sewing machine is formed on the side which is closer to the leading end part 1111-4 on the front-side skin 111-4 side than to the nozzle 142. Therefore, even in a case where an end face 1112-4 of the leading end part 1111-4 on the front-side skin 111-4 side is not disposed in parallel with an upper face of the end part 1122-4 on the rear-side skin 112-4 side, it is possible to bring the end part 1122-4 into tight contact with the end face 1112-4 of the leading end part 1111-4 on the front-side skin 111-4 side by absorbing an inclination of one of the end face 1112-4 and the upper face relative to the other of the end face 1112-4 and the upper face by the seamed boundary part 1123-4.

Thereby, the gap which is formed between the leading end part 1111-4 on the front-side skin 111-4 side and the leading end part 1121-4 on the rear-side skin 112-4 side in the vicinity of the nozzle 142 is closed in the state of exerting the tensile force on the opening 150 in the longitudinal direction of the opening 150 and thereby it is possible to bring the inside of the bag-shaped skin 110 into the state of being sealed against the outside of the skin 110.

The foaming raw material is supplied into the bag-shaped skin 110 through the nozzle 142 by a supplying means which is not illustrated in the drawing and the foamed body 120 is formed by foaming of the foaming raw material in this state. In this case, since the gap which is formed between the leading end part 1111-4 on the front-side skin 111-4 side and the leading end part 1121-4 on the rear-side skin 112-4 side in the vicinity of the nozzle 142 is sealed with the end part 1122-4 on the rear-side skin 112-4 side, it is possible to surely fill the inside of the bag-shaped skin 110 with the foamed body 120 with no leakage of the foamed body 120 to the outside through the opening 150.

Incidentally, as described in the modifications of the first embodiment, the width of the end part 1122-4 on the rear-side skin 112-4 side may be formed smaller than the width L of the leading end part 1111-4 on the front-side skin 111-4 side.

According to the third embodiment, it is possible to seal the gap which is formed between the front-side skin 111-4 (the leading end part 1111-4 thereof) and the rear-side skin 112-4 (the leading end part 1121-4 thereof) in the vicinity of the nozzle 142 with the end part 1122-4 on the rear-side skin 112-4 side in the state of pulling the opening 150 which is formed between the front-side skin 111-4 and the rear-side skin 112-4 in the longitudinal direction of the opening 150. Thereby, it is possible to surely fill the inside of the bag-shaped skin 110 with the foamed body 120 with no leakage of the foamed body 120 to the outside through the opening 150 and thereby it is possible to form a headrest according to the third embodiment by molding without spoiling the appearance quality.

In addition, since it is possible to surely fill the inside of the bag-shaped skin 110 with the foamed body 120 with no leakage of the foamed body 120 to the outside through the opening 150, it is possible to suppress the generation of the defective products and therefore it is possible to increase the yield of the products.

Modification of Third Embodiment

The third embodiment is configured in such a manner that the seamed boundary part 1123-4 is formed at the part which is closer to the leading end of the end part 1122-4 than to the hole 1124-4 through which the nozzle 142 is to be passed. Alternatively, the configuration of the third embodiment may be combined with the configuration of the first embodiment in such a manner that the seamed boundary part 1123-4 is formed in front of and behind the hole 1124-4 through which the nozzle 142 is to be passed relative to the leading end of the end part 1122-4.

Fourth Embodiment

In the first to third embodiments, the configurations in each of which the nozzle 142 of the funnel 141 is inserted into the bag-shaped skin 110 to directly supply the foaming raw material into the bag-shaped skin 110 through the nozzle 142 are described. In contrast, in the fourth embodiment, a configuration that the foaming raw material is supplied into the bag-shaped skin 110 through the nozzle 142 of the funnel 141 via a flexible tube will be described.

A method of manufacturing a headrest 400 according to the fourth embodiment by skin integral molding will be described using FIG. 11 and FIG. 12.

Figure 11:
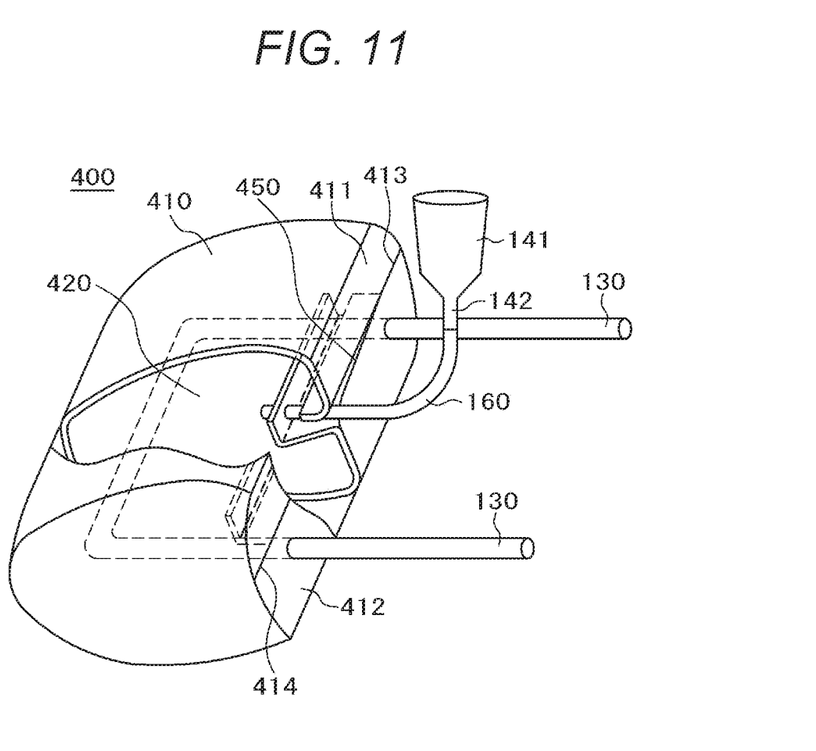
FIG. 11 is a partially sectional perspective view illustrating one example of a headrest according to a fourth embodiment of the present invention.

In FIG. 11, the configuration of the headrest 400 is the same as the configuration of the headrest 100 described in the first embodiment and illustrated in FIG. 1. In the configuration illustrated in FIG. 11, a foaming raw material 420 is supplied into a bag-shaped skin 410 through the nozzle 142 of the funnel 141 which is disposed in a vertical direction via a tube 160 which is made of a flexible material such as vinyl and so forth in a state of laying down the headrest 400 horizontally.

In a state of laying down the ends of the stay 130 horizontally as illustrated in FIG. 11, a side face of the skin 410 from which the ends of the stay 130 project is formed by an upper-side skin 411 and a lower-side skin 412. The upper-side skin 411 corresponds to the front-side skin 111 described in the first embodiment and the lower-side skin 412 corresponds to the rear-side skin 112 described in the first embodiment.

The upper-side skin 411 and the lower-side skin 412 are sewed together and coupled together along parts 413 and 414 similarly to the case described in the first embodiment. A not-sewed part, that is, an opening 450 is formed between the sewed parts 413 and 414. FIG. 11 illustrates one example of a state where the tube 160 is inserted into the opening 450 and the nozzle 142 which is a leading end part of the funnel 141 is inserted into the tube 160 with the opening 450 facing sideways.

Figure 12:
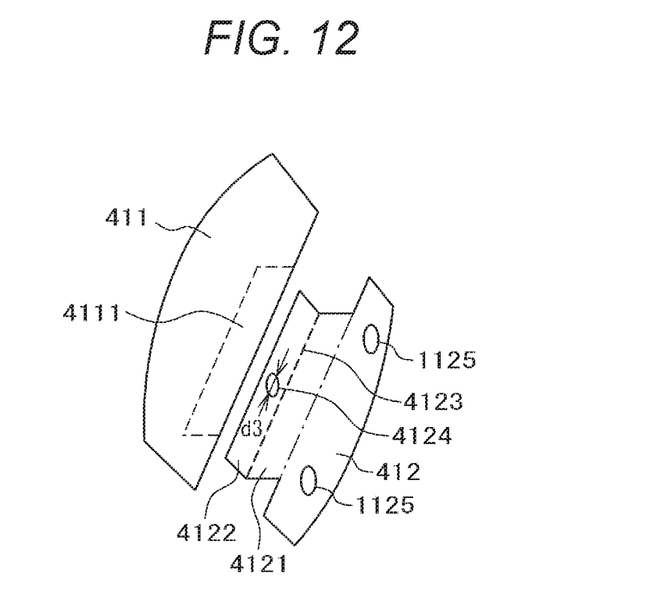
FIG. 12 is a perspective view illustrating one example of a front-side skin and a rear-side skin of the headrest according to the fourth embodiment of the present invention.

As illustrated in FIG. 12, in the upper-side skin 411, a leading end part 4111 of a width which is the same as the width of the opening 450 is bent inward. Although margins to sew up along which the upper-side skin 411 is to be sewed together with the lower-side skin 412 are formed on the both sides of the leading end part 4111, illustration thereof is omitted in FIG. 11 for simplification of illustration.

In contrast, as illustrated in FIG. 11, in the lower-side skin 412, a leading end part 4121 of a width which is the same as the width of the opening 450 is bent inward and further an end part 4122 is formed ahead of the leading end part 4121. The seam is formed on a boundary part 4123 between the leading end part 4121 and the end part 4122 by the sewing machine and thereby the seamed boundary part 4123 is formed thinner than the leading end part 4121 and the end part 4122. Although margins to sew up along which the lower-side skin 412 is to be sewed together with the upper-side skin 411 are formed on the both sides of the leading end part 4121, illustration thereof is omitted in FIG. 11 for simplification of illustration.

4124 denotes a hole which is formed in the leading end part 4121 of the lower-side skin 412 and the tube 160 is inserted into the bag-shaped skin 410 through the hole 4124. A diameter d3 of the hole 4124 is formed to have a dimension which makes it easy for the flexible tube 160 to pass through the hole 4124. Since the tube 160 is made of the flexible material such as vinyl and so forth, it is possible to insert the tube 160 into the hole 4124 by folding the tube 160 to reduce the cross-sectional dimension.

In case of supplying the foaming raw material 420 into the bag-shaped skin 410 through the nozzle 142 and then the tube 160, firstly, the tensile force is exerted on an opening 450 in the longitudinal direction of the opening 450 by using a means which is not illustrated in the drawing. In this state, the leading end part 4111 on the upper-side skin 411 side and the leading end part 4121 on the lower-side skin 412 side come into tight contact with each other.

When the foaming raw material 420 is supplied into the bag-shaped skin 410 through the nozzle 142 and then the tube 160 in this state, the foaming raw material 420 is supplied in a state of being pressurized by a means which is not illustrated in the drawing and therefore the tube 160 which is flattened with the tensile force exerted on the opening 450 is expanded. The hole 4124 which is formed in the leading end part 4121 on the lower-side skin 412 side is formed to have a dimension which allows the tube 160 to come into tight contact with the hole 4124 in a state where the tube 160 is being expanded.

Since the tube 160 is expanded in this way, the gap is formed between the leading end part 4111 on the upper-side skin 411 side and the leading end part 4121 on the lower-side skin 412 side in the vicinity of the tube 160 and a state where the inside of the bag-shaped skin 410 is not sealed against the outside of the skin 410 is brought.

The foaming raw material 420 which is supplied into the bag-shaped skin 410 through the tube 160 foams inside the skin 410. In this case, the supplied foaming raw material 420 stays on the lower side in the bag-shaped skin 410 and foaming proceeds starts from the lower side in the bag-shaped skin 410. Thereby, the end part 4122 on the lower-side skin 412 side which is disposed ahead of the boundary part 4123 on which the seam is formed by the sewing machine is pushed upward by the foaming raw material 420 which grows up from the lower side and is pressed against the leading end part 4111 on the upper-side skin 411 side.

As a result, the gap which is formed between the leading end part 4111 on the upper-side skin 411 side and the leading end part 4121 on the lower-side skin 412 side in the vicinity of the tube 160 is closed in the state of exerting the tensile force on the opening 450 in the longitudinal direction of the opening 450 and thereby it is possible to bring the bag-shaped skin 410 into the state where the inside of the bag-shaped skin 410 is sealed against the outside of the skin 410. Thereby, it is possible to surely fill the inside of the bag-shaped skin 410 with the foaming raw material 420 with no leakage of the foaming raw material 420 to the outside through the opening 450.

According to the fourth embodiment, it is possible to seal the gap which is formed between the upper-side skin 411 (the leading end part 4111 thereof) and the lower-side skin 412 (the leading end part 4121 thereof) in the vicinity of the tube 160 with the end part 4122 on the lower-side skin 412 side in the state of pulling the opening 450 which is formed between the upper-side skin 411 and the lower-side skin 412 in the longitudinal direction of the opening 450 by a pulling means which is not illustrated in the drawing. Thereby, it is possible to surely fill the inside of the bag-shaped skin 410 with the foaming raw material 420 with no leakage of the foaming raw material 420 to the outside through the opening 450 and therefore it is possible to form the headrest 400 by molding without spoiling the appearance quality.

In addition, since it is possible to surely fill the inside of the bag-shaped skin 410 with the foaming raw material 420 with no leakage of the foaming raw material 420 to the outside through the opening 450, it is possible to suppress the generation of the defective products and therefore it is possible to increase the yield of the products.

Although the headrests of vehicle seats are described in the above first to fourth embodiments, the present invention is also usable in seat cushions, seatbacks and armrests of the vehicle seats, not limited to the headrests.

Although, in the foregoing, the present invention which has been made by the inventors concerned has been specifically described on the basis of the preferred embodiments, the present invention is not limited to the above-described embodiments and various modifications are included. For example, it is possible to replace part of a configuration of one embodiment with a configuration of another embodiment within a range not deviating from the gist of the present invention. In addition, it is also possible to add the configuration of another embodiment to the configuration of one configuration. Further, it is also possible to add, delete and replace another well-known configuration to, from and with part of a configuration of each embodiment.

What is claimed is:
1. A skin integral molded article comprising:
a skin formed into a bag shape; and
a foamed body molded integrally with the skin by foaming a foaming raw material inside the skin formed into the bag shape, wherein
the skin formed into the bag shape includes an opening configured to permit supply of the foaming raw material to inside the skin formed into the bag shape for molding the foamed body inside the skin formed into the bag shape,
one side of the opening of the skin formed into the bag shape includes a bent part which is bent into inside the opening, the other side of the opening of the skin formed into the bag shape includes another bent part which is bent into inside the opening and faces the bent part, a pliable part extends from the another bent part, a boundary part is formed between the pliable part and the another bent part, the boundary part is thinner than the another bent part, and the boundary part comprises a sewn structure or a thermoformed structure, a part of the pliable part contacts a tip of the bent part, the pliable part is not sewn to the bent part, and when supplying the foaming raw material inside the skin formed into the bag shape, a gap exists between the bent part and the another bent part at a position near a center of the opening, and the bent part and the another bent part contact each other at positions apart from and on both sides of the center of the opening.

2. The skin integral molded article according to claim 1, wherein the another bent part or the pliable part extending from the another bent part includes a hole configured to receive a nozzle used to supply the foaming raw material inside the skin which is formed into the bag shape, and a diameter of the hole is smaller than the diameter of the nozzle.

3. The skin integral molded article according to claim 1, wherein the another bent part or the pliable part extending from the another bent part includes a hole configured to receive a tube made of flexible material used to supply the foaming raw material inside the skin which is formed into the bag shape, and a diameter of the hole is smaller than the diameter of the tube.

4. A skin integral molded article comprising:

a skin formed into a bag shape; and a foamed body molded integrally with the skin by foaming a foaming raw material inside the skin formed into the bag shape, wherein the skin formed into the bag shape includes an opening configured to permit supply of the foaming raw material to inside the skin formed into the bag shape for molding the foamed body inside the skin formed into the bag shape, one side of the opening of the skin formed into the bag shape includes a bent part which is bent into inside the opening, the other side of the opening of the skin formed into the bag shape includes another bent part which is bent into inside the opening and faces the bent part, a pliable part extends from the another bent part, the pliable part comprises another component joined to the another bent part, a part of the pliable part contacts a tip of the bent part, and a width of the pliable part is smaller than a width of the bent part, and when supplying the foaming raw material inside the skin formed into the bag shape, a gap exists between the bent part and the another bent part at a position near a center of the opening, and the bent part and the another bent part contact each other at positions apart from and on both sides of the center of the opening.

5. The skin integral molded article according to claim 4, wherein the another bent part or the pliable part extending from the another bent part includes a hole configured to receive a nozzle used to supply the foaming raw material inside the skin which is formed into the bag shape, and a diameter of the hole is smaller than the diameter of the nozzle.

6. The skin integral molded article according to claim 4, wherein the pliable part is formed by sewing the another component or by thermocompression-bonding the another component to the another bent part.

7. The skin integral molded article according to claim 4, wherein the another bent part or the pliable part extending from the another bent part includes a hole configured to receive a tube made of flexible material used to supply the foaming raw material inside the skin which is formed into the bag shape, and a diameter of the hole is smaller than the diameter of the tube.

8. A skin integral molded article comprising:

a skin formed into a bag shape, the skin comprising:

an opening configured to allow foaming raw material to be supplied to inside the skin, a bent part and another bent part disposed on opposite sides within the opening, wherein when foaming raw material is supplied inside the skin, a gap exists in the opening between the bent part and the another bent part, and the bent part and the another bent part contact each other at positions away from the center of the opening, a pliable part extending from the another bent part, a part of the pliable part contacting a tip of the bent part, a width of the pliable part being smaller than a width of the bent part, wherein a seam divides a portion of the skin forming the pliable part and the another bent part, and the seam is thinner than the another bent part, or the pliable part comprises a separate member joined to the another bent part; and a foamed body molded integrally within the skin, the foamed body having been formed by supplying and foaming a foaming raw material inside the skin.

9. The skin integral molded article according to claim 8, wherein the seam divides a portion of the skin forming the pliable part and the another bent part, and the seam is formed by sewing or thermoforming.

10. The skin integral molded article according to claim 8, wherein the pliable part comprises the separate member joined to the another bent part by sewing or thermal compression bonding.

* * * * *